(12) United States Patent
Carlson et al.

(10) Patent No.: US 10,654,503 B1
(45) Date of Patent: May 19, 2020

(54) TACTICAL TRANSPORT CART FOR MANUAL NAVIGATION OVER BOTH TOPOGRAPHIC AND HYDROGRAPHIC TERRAINS

(71) Applicant: Hendrick Motorsports Performance Group, LLC, Charlotte, NC (US)

(72) Inventors: Marshall Carlson, Charlotte, NC (US); Mark Allen Thoreson, Charlotte, NC (US)

(73) Assignee: Hendrick Motorsports Performance Group, LLC, Charlotte, NC (US)

( * ) Notice: Subject to any disclaimer, the term of this patent is extended or adjusted under 35 U.S.C. 154(b) by 191 days.

(21) Appl. No.: 15/616,992

(22) Filed: Jun. 8, 2017

(51) Int. Cl.
| | |
|---|---|
| *B62B 1/12* | (2006.01) |
| *B62B 1/16* | (2006.01) |
| *B62B 5/00* | (2006.01) |
| *B62B 5/06* | (2006.01) |
| *B62D 55/04* | (2006.01) |

(52) U.S. Cl.
CPC .................. *B62B 1/12* (2013.01); *B62B 1/16* (2013.01); *B62B 5/0036* (2013.01); *B62B 5/0046* (2013.01); *B62B 5/0069* (2013.01); *B62B 5/061* (2013.01); *B62D 55/04* (2013.01); *B62B 5/004* (2013.01); *B62B 5/0043* (2013.01); *B62B 2301/256* (2013.01)

(58) Field of Classification Search
CPC .. B62D 55/04; B62B 1/04; B62B 1/10; B62B 1/12; B62B 1/16; B62B 1/18; B62B 1/20; B62B 5/00; B62B 5/0026; B62B 5/0033; B62B 5/0036; B62B 5/004; B62B 5/0043; B62B 5/0046; B62B 5/0053; B62B 5/0061; B62B 5/06; B62B 5/061
See application file for complete search history.

(56) References Cited

U.S. PATENT DOCUMENTS

| | | | |
|---|---|---|---|
| 2,567,423 A | | 9/1951 | Cleghorn |
| 2,656,894 A | | 10/1953 | Giovannoni |
| 2,869,661 A | * | 1/1959 | Fernandez .............. B62B 3/009 180/19.1 |
| 2,918,299 A | * | 12/1959 | Lambert ................... B62B 1/18 180/19.1 |
| 2,999,555 A | | 9/1961 | Stroud et al. |

(Continued)

*Primary Examiner* — Joseph M Rocca
*Assistant Examiner* — Maurice L Williams
(74) *Attorney, Agent, or Firm* — Nelson Mullins Riley & Scarborough LLP (57) ABSTRACT

A tactical transport cart manually navigable by a single human operator over both topographic and hydrographic terrains has a frame, a payload-supporting area on the frame, a pair of wheels or other terrain-engaging transport propulsion members attached to the frame, a handle structure attached to the frame, at least one motor connected in driving relation to the transport propulsion members, a battery for providing motive power to the motor, and a control device connected between the battery and the motor for controlling supply of motive power to the motor, with a switch device mounted on the handle structure for selective actuation and deactuation of the motor. The frame, transport propulsion members and handle structure are cooperatively dimensioned and configured for movement of the cart over ground surfaces of topographic terrains and for partially and fully submerged movement over water-covered surfaces of hydrographic terrains.

19 Claims, 6 Drawing Sheets

(56) References Cited

U.S. PATENT DOCUMENTS

| | | | |
|---|---|---|---|
| 3,055,449 A | 9/1962 | Murphy | |
| 3,135,346 A | 6/1964 | Bertozzi, Sr. | |
| 3,155,185 A | 11/1964 | Allen et al. | |
| 3,236,537 A * | 2/1966 | Eckman | B62B 5/068 280/47.18 |
| 3,679,227 A | 7/1972 | Rock | |
| 3,690,692 A * | 9/1972 | Berkeley | B62B 1/208 220/6 |
| 3,692,135 A | 9/1972 | Holzmann | |
| 3,807,585 A | 4/1974 | Holzmann | |
| 3,820,807 A * | 6/1974 | Curran | B62B 5/061 280/47.3 |
| 3,860,254 A * | 1/1975 | Wegener | B62B 1/208 280/652 |
| 3,913,762 A * | 10/1975 | Alexander | B62B 1/14 280/47.24 |
| 4,055,354 A * | 10/1977 | Sharpe | B62B 5/061 280/47.31 |
| 4,063,744 A * | 12/1977 | Fraser | B62B 1/208 280/42 |
| 4,589,508 A * | 5/1986 | Hoover | B62B 1/24 180/13 |
| 4,646,860 A | 3/1987 | Owens et al. | |
| 5,149,118 A | 9/1992 | Oxford | |
| 5,690,046 A | 11/1997 | Grzech, Jr. | |
| 6,129,166 A | 10/2000 | Sueshige et al. | |
| 6,139,029 A * | 10/2000 | Shaw | B62B 1/206 280/47.371 |
| 6,173,799 B1 * | 1/2001 | Miyazaki | B60L 11/1822 180/19.3 |
| 6,325,395 B1 | 12/2001 | Frymoyer | |
| 6,419,244 B2 * | 7/2002 | Meabon | B62B 1/002 280/47.17 |
| 6,474,007 B1 * | 11/2002 | Sueshige | B62B 1/20 180/19.3 |
| 6,712,652 B2 | 3/2004 | Roycroft | |
| 6,736,417 B1 * | 5/2004 | Whitmire | A61G 1/017 280/47.3 |
| 6,793,236 B1 | 9/2004 | Mitchell | |
| 6,821,166 B2 | 11/2004 | Roycroft et al. | |
| 6,824,150 B2 | 11/2004 | Simione | |
| 6,855,017 B2 | 2/2005 | Roycroft | |
| 7,032,921 B2 * | 4/2006 | Swanner | B62B 1/125 280/645 |
| 7,131,666 B1 | 11/2006 | Jenney | |
| 7,172,207 B2 | 2/2007 | Henry | |
| 7,329,161 B2 | 2/2008 | Roering | |
| 7,438,611 B2 | 10/2008 | Gibbs | |
| 7,445,530 B2 | 11/2008 | Munshauer et al. | |
| 7,770,483 B2 | 8/2010 | Gibbs | |
| 7,793,744 B1 | 9/2010 | Hardie | |
| 8,419,046 B2 * | 4/2013 | Limontini | A61G 1/0293 280/640 |
| 8,613,455 B2 | 12/2013 | Berrett et al. | |
| 8,668,535 B1 | 3/2014 | Scroggs | |
| 8,714,570 B2 * | 5/2014 | Skijus | B60N 3/026 16/422 |
| 8,783,698 B1 | 7/2014 | Elizondo et al. | |
| 8,936,268 B2 * | 1/2015 | Craven | B62B 1/008 280/652 |
| 9,365,087 B2 | 6/2016 | Aoki et al. | |
| 9,381,932 B1 * | 7/2016 | Giamanco | A45C 13/262 |
| 9,415,789 B2 | 8/2016 | Sommers | |
| D770,966 S | 11/2016 | Teixeira | |
| 9,517,670 B2 | 12/2016 | Gibbs et al. | |
| 9,623,924 B2 * | 4/2017 | Huskey | B62D 63/062 |
| 9,956,976 B1 * | 5/2018 | Akre | B62B 3/02 |
| 9,986,731 B2 * | 6/2018 | Mitchell | A01M 31/006 |
| 2002/0017411 A1 * | 2/2002 | Weiss | A45C 5/14 180/168 |
| 2003/0080538 A1 | 5/2003 | Watts et al. | |
| 2004/0065242 A1 | 4/2004 | Hough et al. | |
| 2004/0084864 A1 | 5/2004 | Casey et al. | |
| 2005/0023787 A1 * | 2/2005 | Haynes | B62B 3/002 280/79.11 |
| 2005/0212242 A1 * | 9/2005 | Cheng | B62B 3/02 280/79.11 |
| 2006/0273554 A1 * | 12/2006 | Henry | B60D 1/00 280/652 |
| 2007/0089917 A1 * | 4/2007 | Hartley | B60L 11/1877 180/65.1 |
| 2007/0216116 A1 * | 9/2007 | Gallea | A47B 85/06 280/47.36 |
| 2007/0261905 A1 * | 11/2007 | Lin | B62B 1/18 180/213 |
| 2008/0048417 A1 | 2/2008 | Schroeder | |
| 2008/0197608 A1 | 8/2008 | Dixon | |
| 2008/0296866 A1 * | 12/2008 | Martin | B62B 5/06 280/304.5 |
| 2009/0166999 A1 * | 7/2009 | Mason | B62B 3/02 280/651 |
| 2010/0110634 A1 * | 5/2010 | Woodbury, II | B62B 5/0026 361/698 |
| 2010/0270764 A1 * | 10/2010 | Odle | B62B 1/12 280/47.19 |
| 2011/0101135 A1 * | 5/2011 | Korus | B62D 55/04 239/723 |
| 2013/0127138 A1 * | 5/2013 | Ferree, Jr. | B62B 3/02 280/638 |
| 2013/0267132 A1 | 10/2013 | Jeffery et al. | |
| 2015/0197260 A1 * | 7/2015 | Dilone, Jr. | B62B 1/125 280/30 |
| 2015/0291078 A1 * | 10/2015 | Carrillo, Jr. | B62B 1/20 296/100.02 |
| 2015/0336220 A1 * | 11/2015 | Christopher | B23K 37/0294 219/137.2 |
| 2016/0121943 A1 * | 5/2016 | Lamb | B62D 51/005 180/19.3 |
| 2016/0200335 A1 | 7/2016 | Piscitello et al. | |
| 2016/0347342 A1 * | 12/2016 | McCaldon | B62B 1/20 |
| 2016/0375737 A1 | 12/2016 | Klouzal | |
| 2017/0282948 A1 * | 10/2017 | Bae | B62B 1/20 |
| 2018/0265146 A1 * | 9/2018 | Laplante | B62D 55/04 |

* cited by examiner

TACTICAL TRANSPORT CART FOR MANUAL NAVIGATION OVER BOTH TOPOGRAPHIC AND HYDROGRAPHIC TERRAINS

FIELD OF THE INVENTION

The present invention relates generally to transport devices for moving various articles, including personnel, such as devices commonly referred to as carts, and more particularly, to carts adapted to tactical uses by military, law enforcement, fire, rescue and emergency response organizations for transporting items over diverse terrains, both over land surfaces and water-covered surfaces.

BACKGROUND OF THE INVENTION

Utility carts of many diverse structures with varied features, capabilities and end-use applications are known. The most basic carts are in the nature of unpowered wheelbarrows, wagons or trailers of a sufficiently small size and weight to be manually pushed or pulled over paved or generally flat or level unpaved surfaces. Some such carts contemplate a structure having active positive buoyancy to float on the surface of bodies of water to allow pushing or pulling motivation through water. Other carts are motorized to supplement manual movement and guidance, but no such carts are known to be operable within or through bodies of water or other water-covered terrain.

The conditions under which military, law enforcement, fire, rescue, and other emergency personnel operate are especially diverse and demanding. They may be called upon to navigate over remote and undeveloped terrains that may be hilly, rocky, and otherwise hazardous, as well as over water-covered areas ranging from creeks, streams, swamplands, ponds, and rivers that are equally or more difficult and hazardous. Such personnel also typically must transport various types of supplies and equipment into and out of such areas, and in some cases to move wounded or injured persons who are incapable of walking or moving under their own power. None of the known carts are suitable to operate under such differing conditions, for the varied tactical uses and purposes, and over the differing possible terrains as persons in these professions must deal with.

Accordingly, a need exists for a tactical cart adapted for manual navigation over both land and water-covered terrains to transport diverse articles.

SUMMARY OF THE INVENTION

Briefly summarized, the present invention provides a tactical transport cart configured to be manually navigable by a single human operator over both ground surfaces of topographic terrains and water-covered surfaces of hydrographic terrains. As used herein, "hydrographic terrains" is meant to fully encompass and include essentially all possible surfaces that are underwater or water-covered through which humans can walk, wade or swim, either above or below the water surface, including natural water-covered surfaces ranging from creek beds, stream beds, river beds, pond and lake beds, ocean floors, flooded areas, to swamps and muddy regions, and water-covered man-made surfaces such as culverts, storm sewers, drains, gutters, ditches, aqueducts, sluiceways, causeways, and spillways. "Topographic terrains" is meant to fully encompass and include essentially all other possible ground surfaces over which humans can ambulate by walking or crawling, including without limitation natural land surfaces ranging from fields, meadows, forests, woods, hills, mountains, rocks, unpaved trails and other above ground surfaces, to caves, caverns, tunnels and other subterranean surfaces, and man-made surfaces ranging from paved roads, paths, and other outdoor man-made surfaces, to structural surfaces such as hallways, breezeways and staircases.

According to the present invention, the transport cart basically comprises a frame, a payload-supporting area on the frame, a pair of terrain-engaging transport propulsion members attached to the frame in laterally spaced relation for supporting the frame at an elevation above surrounding terrain, and a handle structure attached to the frame and extending therefrom in orthogonal relation to the transport propulsion members. At least one motor is connected in driving relation to the transport propulsion members, and a battery is provided to supply motive power to the motor. A control device is operatively connected between the battery and the motor for controlling supply of motive power to the motor. The control device includes a switch device operable from the handle structure for selective actuation and deactuation of the motor. The handle structure is configured for manual grasping by a single human operator for steering movement of the frame over surrounding terrain while enabling simultaneous selective access to and operation of the control device. The frame, transport propulsion members and handle structure are cooperatively dimensioned and configured for movement of the cart over ground surfaces of topographic terrains and for partially and fully submerged movement over underwater and other water-covered surfaces of hydrographic terrains. The motor, the battery, the control device and connections therebetween are sealed to prevent water intrusion during partially or fully submerged operation.

Various embodiments and alternative features are contemplated for the tactical cart of this invention. As used herein, "terrain-engaging transport propulsion members" is meant to fully encompass and include essentially all possible means of supporting and moving the frame and other cart components as a unit across topographic and hydrographic terrains. For example, in contemplated embodiments, a pair of wheels may be rotatably attached, preferably in co-axial relation to each other, to opposite sides of the frame to serve as the transport propulsion members, and in other contemplated embodiments, a pair of track mechanisms may be attached to opposite sides of the frame as the transport propulsion members. One or more additional wheels or track mechanisms could also be provided.

In wheeled embodiments, the wheels may include enlarged tires inflated at a relatively low pressure to present a wide footprint in contact with a surface, to optimize contact with terrain surfaces, such as tires commonly known as "all-terrain" and "high flotation" tires. Such tires do not actually impart buoyancy to the extent of a capability of the tires and cart for flotation at the surface of a body of water, but rather provide a profile and sufficient incremental buoyancy that enhances the surface area of contact by the tires to resist miring down in muddy, wet, loose or soft soils.

Differing motor arrangements are also contemplated. For example, in some embodiments, a motor may be mounted to the frame with at least one drive shaft extending outwardly for mounting of the wheels, track mechanisms, or other transport propulsion members. Alternatively, in other embodiments, individual motors may be assembled with the transport propulsion members, such as a so-called hub motor incorporated into a hub portion of each wheel, or a motor incorporated into each track mechanism.

Various configurations of the frame of the present cart are possible. For example, in contemplated embodiments, the frame includes frame members extending in a longitudinal direction and a cart body extending downwardly from the frame members for defining a lower enclosure. In such embodiments, the transport propulsion members may be attached to a lower side of the cart body and a platform may be affixed to the frame at an upper side of the cart body for defining the payload supporting area. The battery may be contained within a sealed battery housing and the motor may be contained within a sealed motor housing, each housed within the enclosure of the cart body. A general use storage compartment may also be provided within the enclosure.

Differing configurations of the handle structure are possible. In contemplated embodiments, the handle structure may comprise a pair of laterally spaced-apart handles attached to rearward ends of the frame members, and may further include means for mounting the handles selectively in multiple positions relative to the frame members. A second pair of laterally spaced-apart handles may be attached to forward ends of the frame members for optional assisted navigation of the cart by a second human operator. The switch device may include a throttle control on the handle structure for modulating operation of the motor.

Differing configurations of payload supports are also possible. For example, open and enclosed cargo boxes of differing sizes and configurations suited to carrying differing items of equipment, supplies, and the like could be mounted to the frame in addition to or instead of a platform. A litter for carrying injured or wounded personnel could be fitted to the frame. Any number of other purpose-built payload supports are also contemplated.

In one particular disclosed embodiment, the tactical transport cart comprises a frame having laterally spaced-apart longitudinally-extending frame members, a cart body extending downwardly from the frame members defining a lower enclosure, and a platform affixed to the frame at an upper side of the cart body defining a payload supporting area thereabove. A motor is contained within the enclosure within a motor housing sealed against water intrusion and having at least one drive shaft with opposite shaft ends extending sealably outwardly through the motor housing and outwardly therefrom to opposite sides of the frame at a lower side of the cart body. A pair of wheels is affixed to the opposite ends of the at least one drive shaft in laterally spaced coaxial relation for supporting the frame substantially entirely above the axis of the wheels, the wheels including all-terrain high-flotation tires. A battery is contained within the enclosure of the cart body within a battery housing sealed against water intrusion. A motor controller is housed within the enclosure of the cart body in sealed operative connection between the battery and the motor for controlling supply of motive power to the motor. A handle structure comprising a pair of laterally spaced-apart handles is attached to rearward ends of the frame members in perpendicular relation to the axis of the wheels. A switch device is mounted on one of the handles and operatively connected sealably to the motor controller for selective remote actuation of the motor, the switch device including a throttle control for modulating operation of the motor. The handle structure is configured for manual grasping of the handles by a single human operator for steering movement of the frame while enabling simultaneous access to and operation of the control device via the switch. The frame, wheels and handle structure are cooperatively dimensioned and configured for rolling movement of the cart over ground surfaces of topographic terrains and for partially and fully submerged rolling movement over underwater and other water-covered surfaces of hydrographic terrains.

DETAILED DESCRIPTION OF THE INVENTION

Figure 1:
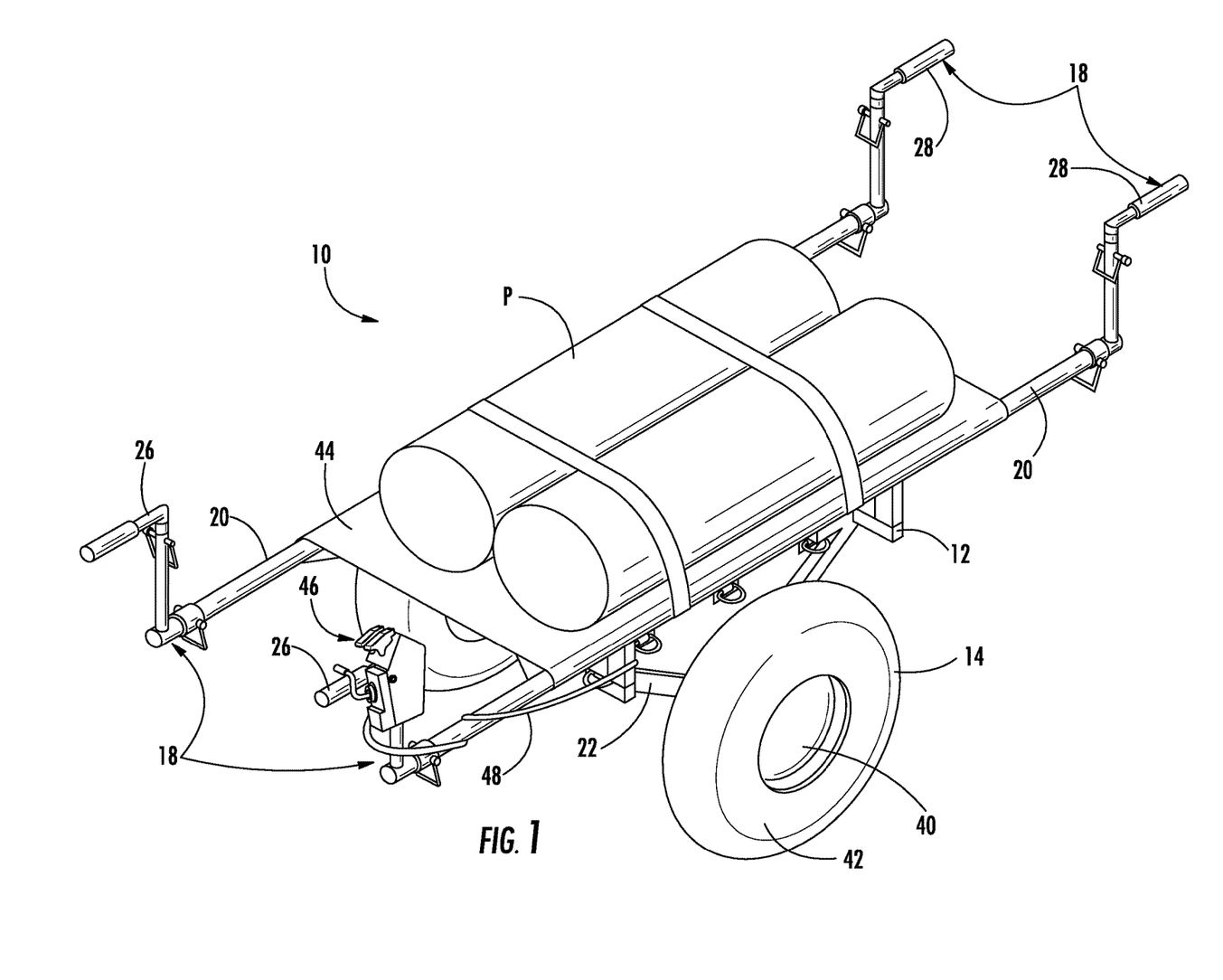
FIG. 1 is a perspective view of one contemplated embodiment of tactical transport cart according to the present invention.
Figure 2:
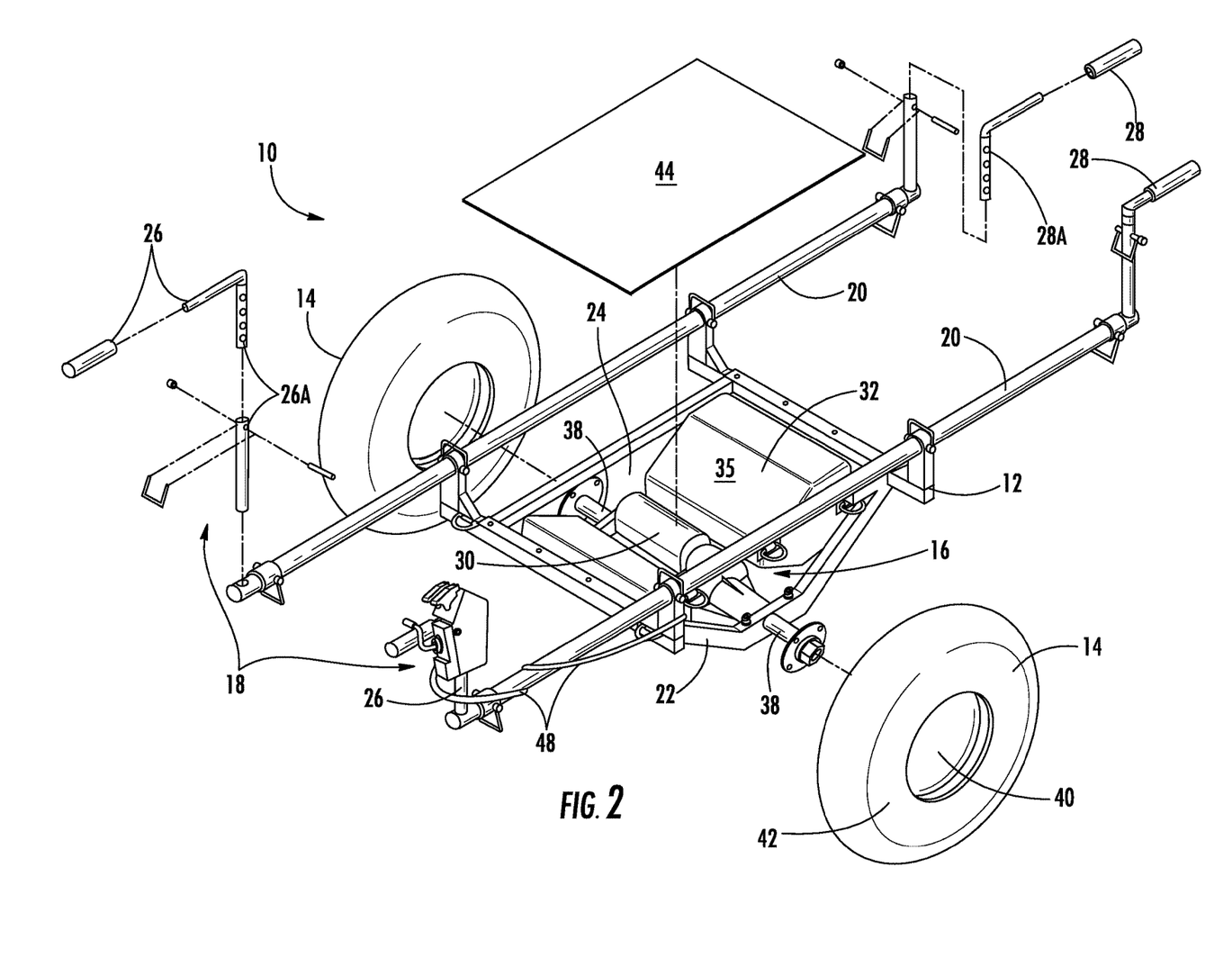
FIG. 2 is a partially exploded perspective view of the tactical transport cart of FIG. 1.
Figure 3:
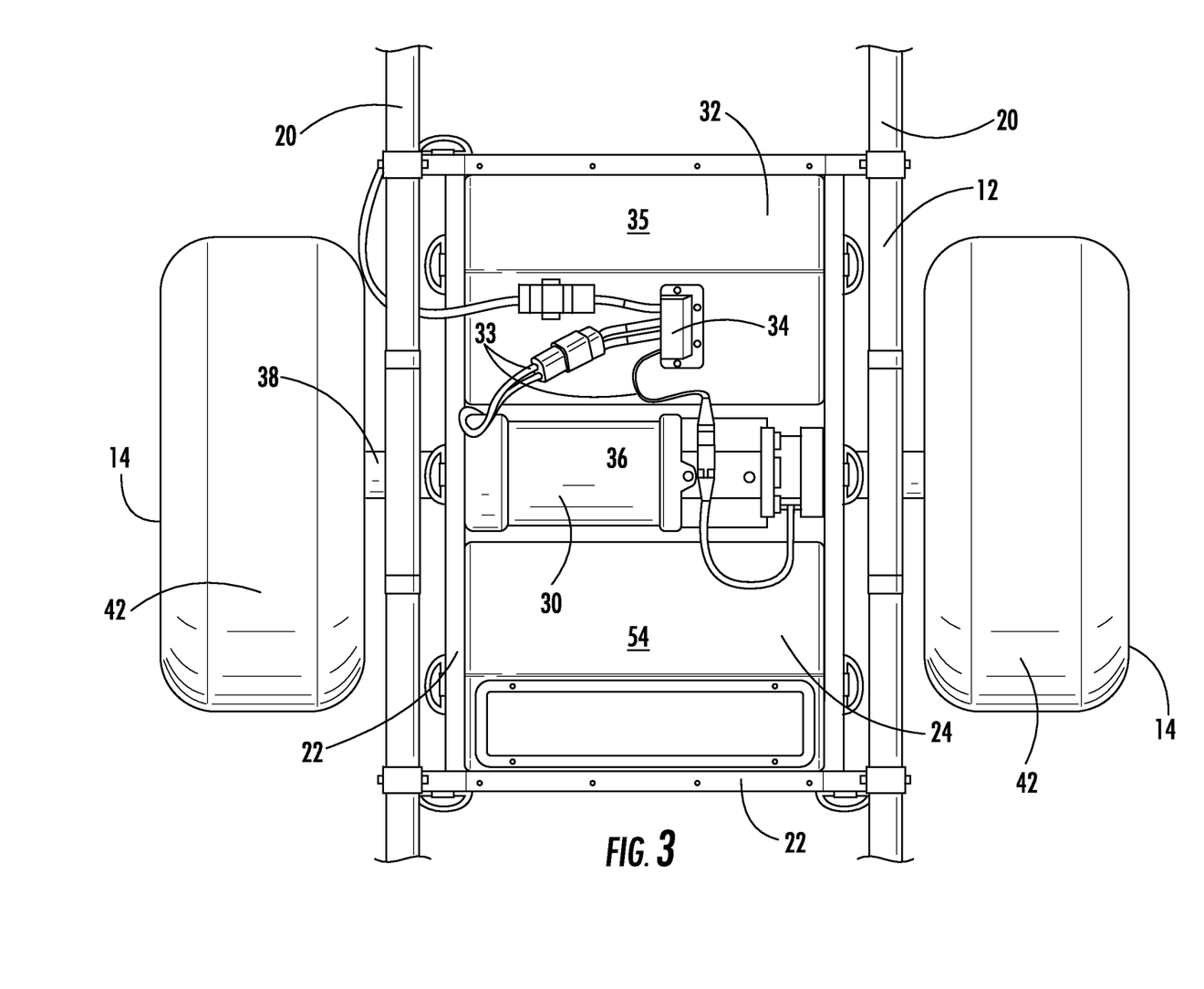
FIG. 3 is a top plan view of the tactical transport cart of FIG. 1, with the payload platform removed.

Referring now to the accompanying drawings and initially to FIGS. 1-3, one possible embodiment of a tactical transport cart according to the present invention is indicated generally at 10, and basically comprises a frame 12 supported on a pair of wheels 14, with a powertrain, indicated overall at 16, for driving the wheels 14, and a handle structure, generally indicated at 18, attached to the frame 12 for manual steering and guidance of the cart 10.

The frame 12 is an open, lightweight structure formed by a pair of laterally spaced-apart longitudinally-extending frame members 20 between which a triangular cart body 22 is centrally affixed and extends downwardly therefrom defining a lower enclosure 24 within the cart body 22. The powertrain 16 is housed within the enclosure 24 of the cart body 22 and basically comprises a motor 30, battery 32, and motor controller 34. The motor 30 is in the form of a motor and transaxle assembly contained within a common housing 36 and mounted within the lowermost region of the enclosure 24, with a pair of drive shafts 38 extending co-axially outwardly from opposite ends of the housing 36 and outwardly therefrom to opposite lateral sides of the cart body 22. The battery 32 and the motor controller 34 are contained in a common housing 35 mounted within the enclosure 24 of the cart body 22 adjacent the motor 30, with the motor controller 34 being operatively connected by cables 33 between the battery 32 and the motor 30 for controlling supply of motive power to the motor 30. In addition, one or more sealed storage compartments may be provided within the cart enclosure, such as representatively indicated at 54, to carry various smaller supplies, spare parts, tools, and the like.

Each wheel 14 comprises a central hub 40 about which is mounted an all-terrain high-flotation tire 42. The wheels 14 are affixed in coaxial relationship by mounting their respective hubs 40 to the laterally outward ends of the drive shafts 38 of the motor/transaxle assembly, thereby supporting the frame 12 substantially entirely above the axis of the wheels 14. The handle structure 18 comprises a first pair of laterally spaced-apart handles 26 attached to respective rearward ends of the frame members 20 and a second pair of laterally spaced-apart handles 28 attached to respective forward ends of the frame members 20, in perpendicular or orthogonal relationship to the axis of the wheels 14. A platform 44 is affixed to the frame members 20 adjacent the upper side of the cart body 22 for defining a payload supporting area thereabove on which may be transported any of various types of payloads, as representatively depicted by payload P.

Figure 4:
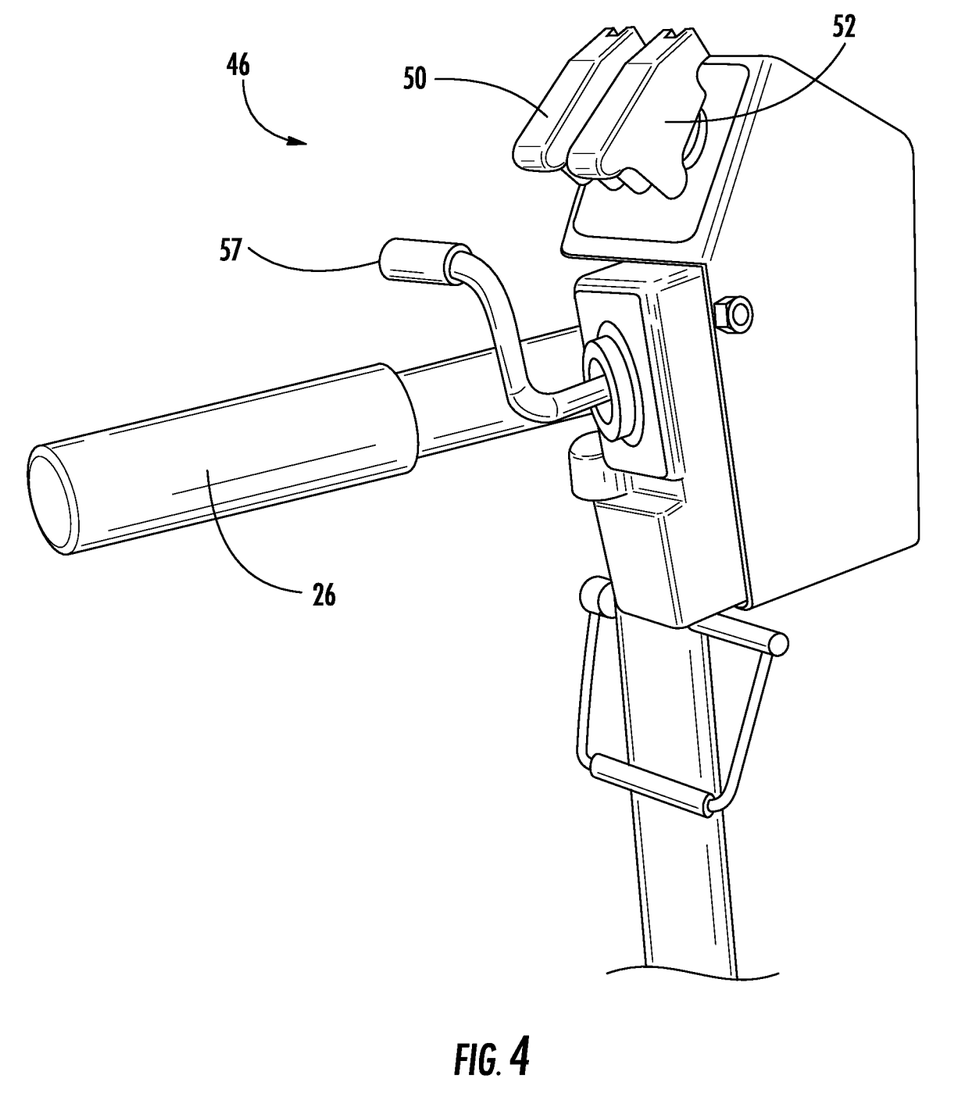
FIG. 4 is an elevational view of the control switches mounted on the handle structure of the tactical transport cart of FIG. 1.

A switch device, indicated overall at 46, is mounted on one of the rear handles 26 and is operatively connected by a cable 48 to the motor controller 34 for selective remote actuation and deactuation of the motor 30. As depicted in FIG. 4, the switch device 46 includes an on-off switch 50, a speed switch 52 selectable between high power and low power modes, and a throttle control lever 57 for modulating the delivery of battery power to the motor 30. The motor/transaxle housing 36, the battery/controller housing 35, the switch device 46 and the connections therebetween are each sealed against water intrusion.

The rearward handles 26 of the handle structure 18 are configured for manual grasping of the handles by a single human operator for steering movement of the cart 10 while simultaneously operating the motor controller 34 via the switch device 46. Either or both of the forward handles 28 may optionally be grasped by a second human operator to assist in maneuvering and guidance of the cart 10 during navigation, but no controls for powered operation of the cart are provided on or in proximity to the forward handles 28. Both sets of handles 26, 28 may be provided with a series of adjustment holes 26A, 28A, best seen in FIG. 2, to enable fine adjustment of the height of the handles and their extension forwardly and rearwardly from the frame 12, as may be desirable to adapt the handles 26, 28 for different operators.

The operation of the cart 10 may thus be understood. All of the structure of the cart 10, including particularly the frame 12, wheels 14, powertrain 16 and handle structure 18, is designed dimensionally and in configuration to facilitate manual navigation over diverse and varied terrains by a single human operator. More specifically, the cart 10 can be maneuvered manually, either under the drive power on the powertrain or solely under the manual power of the operator, over substantially any terrain over which the human operator can walk, crawl or swim, including in particular both ground surfaces of topographic terrains and underwater and other water-covered hydrographic terrains. In topographic terrains, the cart 10 is capable of powered or unpowered rolling movement under the guidance of an operator over paved and unpaved ambulatory land surfaces including natural surfaces such as fields, meadows, forests, woods, hills, mountains, rocks, unpaved trails, caves, caverns, tunnels, and other above ground and subterranean land surfaces, and man-made surfaces such as roads, paths, hallways, breezeways, step structures, staircases and other outdoor and indoor man-made surfaces. In such environments, the operator manually guides rolling movement of the cart 10 over the ground surface via the handles 26 while walking, running or even crawling behind the cart, with selective activation of the switch device 46 to assist with powered motivation of the cart 10 as needed.

Owing to the lightweight frame structure, the use of all-terrain high-flotation tires, and sealed powertrain components, the cart 10 is equally capable of partially and fully submerged powered or unpowered movement over water-covered hydrographic terrains including creek beds, stream beds, river beds, pond and lake beds, flooded areas, swamps and muddy regions, culverts, storm sewers, drains, gutters, ditches, aqueducts, sluiceways, causeways, spillways and other natural and man-made underwater surfaces. In such environments, the operator manually guides rolling movement of the cart 10 on the underwater surface from behind the cart via the handles 26 while walking over or wading through areas covered with relatively shallow depths of water, or even floating or paddling behind the cart through areas covered with deeper depths of water. Even in areas with water depths above the height of an operator, the cart 10 is capable of rolling navigation over the underwater surface, although the operator may need underwater breathing apparatus depending on the underwater distance to be traveled.

Figure 5:
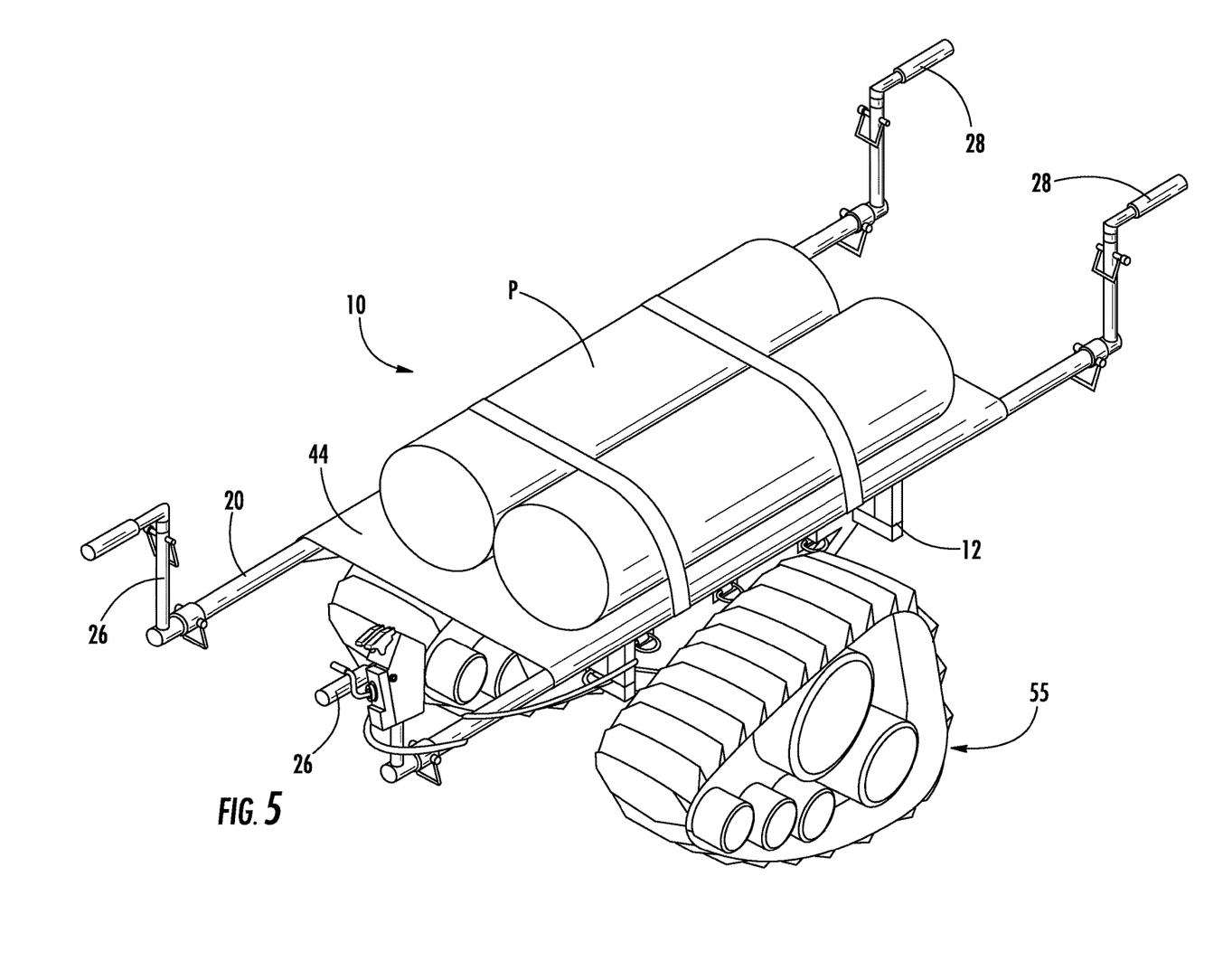
FIG. 5 is a perspective view of another contemplated embodiment of tactical transport cart according to the present invention.

Persons skilled in the art will recognize and understand that various additional and alternative features and embodiments of the cart are possible within the scope of the invention. For example, the cart could be equipped with continuous track mechanisms instead of wheels, such as representatively depicted at 55 in FIG. 5. As is known, track systems can provide enhanced navigation over soft terrains and also sharper steering and turning through driving the track mechanisms at differential speeds and/or in opposite directions, but otherwise track mechanisms are generally interchangeable with wheel/hub assemblies on wheeled vehicles.

Figure 6:
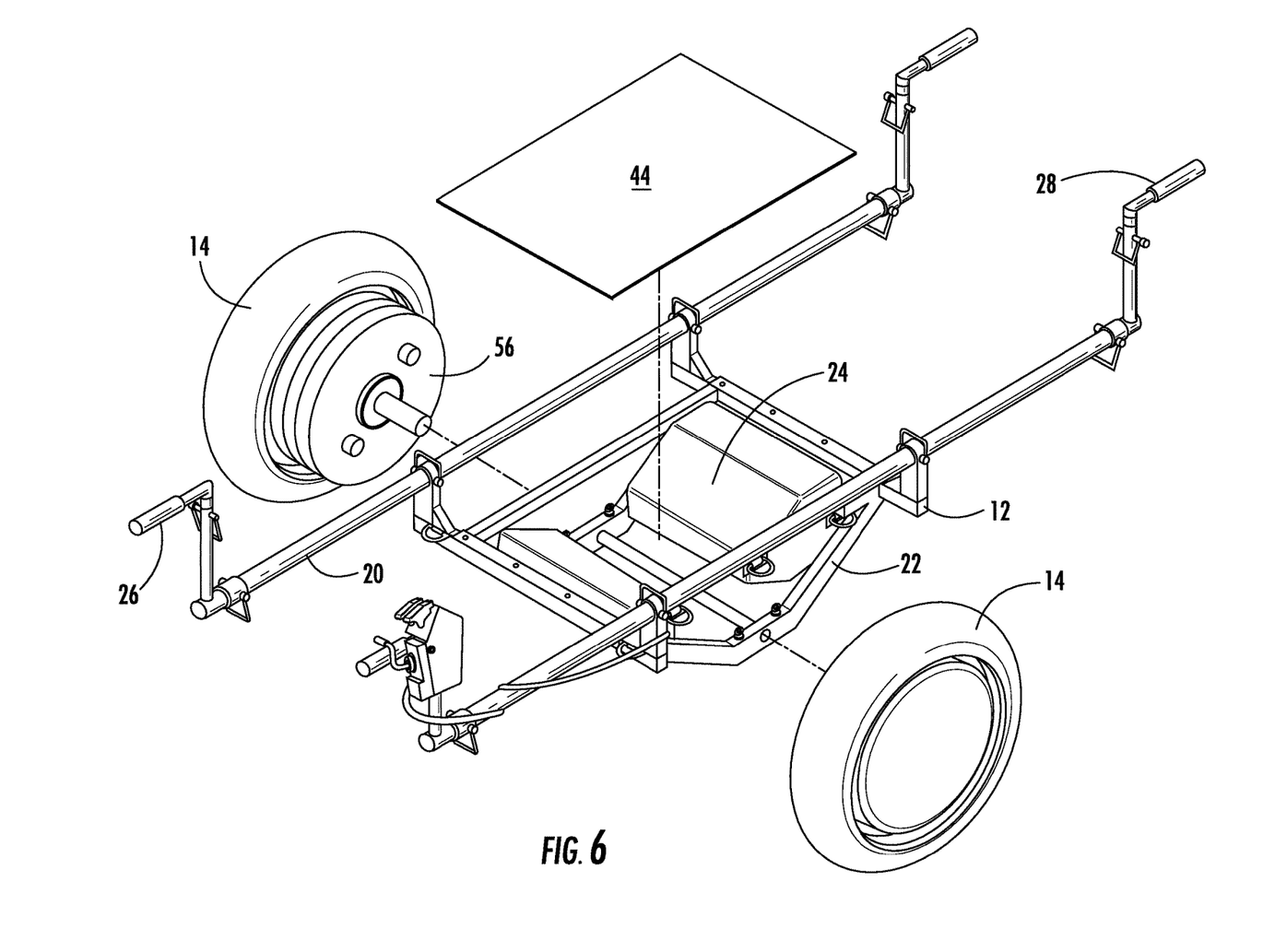
FIG. 6 is a perspective view of another contemplated embodiment of tactical transport cart according to the present invention.

Alternatively, in wheeled embodiments of the cart, each of the wheels could be equipped with an individual hub-mounted motor, such as depicted at 56 in FIG. 6, instead of the motor/transaxle assembly. Hub mounted wheel motors are well known and would offer the advantage of freeing additional space within the enclosure of the cart body to carry smaller items beneath the platform.

As will also be understood, the payload platform in the embodiments of FIGS. 1-6 is merely representative. Various configurations of supports for carrying payload may be affixed to the frame instead of, interchangable with or in addition to a platform configuration, including for example but without limitation open and enclosed cargo boxes, a litter for carrying injured or wounded personnel, and any number of other purpose-built payload carriers designed for specific cargo applications.

Likewise, differing forms of handle structures are also contemplated. For example, a U-shaped or other handle structure transversely spanning between the frame members could offer the advantage of allowing an operator to actuate and deactuate the powertrain and guide navigation of the cart via different hand positions or possibly with only one hand.

While the cart of the present invention is not intended to float nor otherwise to be operable on the surface of a body of water, the cart could be equipped with supplemental flotation units to partially offset the weight of the cart and payload so as to allow the wheels, tracks, or other transport propulsion members of the cart to remain engaged with underwater and other water-covered hydrographic terrains but would aid in preventing the transport propulsion members from sinking into soft underwater surfaces, such as under ponds, streams and the like.

The advantages of the cart 10 for tactical uses by military, law enforcement, fire, rescue and emergency personnel will therefore be appreciated and understood. Fundamentally, the cart of the present invention combines into a single unit the capabilities of various other existing known transport devices. Further, the capability of the cart to navigate over virtually any topographic or hydrographic terrain expands the potential applications and uses of the cart enormously. The ability for a single operator to navigate the cart over such terrains further expands the applications for the cart. In a military setting, soldiers can transport weapons, munitions, equipment, food, water, and the like into battle settings in greater quantities, more rapidly and with less effort than any known conventional means. Law enforcement, fire, rescue and emergency personnel are similarly benefited by an ability to transport gear more quickly and easily into remote areas accessible only by foot.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A tactical transport cart configured to be manually navigable by a single human operator over both ground surfaces of topographic terrains and water-covered surfaces of hydrographic terrains, the transport cart comprising:
    a frame having an open structure formed by a pair of laterally spaced-apart longitudinally-extending frame members, a triangular cart body centrally affixed and extending downwardly from the frame members defining a lower enclosure within the cart body, and a platform affixed to the frame at an upper side of the cart body defining a payload-supporting area on the frame,
    a pair of terrain-engaging transport propulsion members attached to the frame in laterally spaced relation for supporting the frame at an elevation above surrounding terrain,
    a handle structure attached to the frame and extending therefrom in orthogonal relation to the transport propulsion members,
    at least one motor connected in driving relation to the transport propulsion members,
    a battery for providing motive power to the motor,
    a control device operatively connected between the battery and the motor for controlling supply of motive power to the motor, the control device including a switch device operable from the handle structure for selective actuation and deactuation of the motor,
    the handle structure being configured for manual grasping by a single human operator for steering movement of the frame over surrounding terrain while enabling simultaneous selective access to and operation of the control device,
    the frame, transport propulsion members and handle structure being cooperatively dimensioned and configured for movement of the cart over ground surfaces of topographic terrains and for partially and fully submerged movement over water-covered surfaces of hydrographic terrains,
    the motor, the battery, the control device and connections therebetween being sealed against water intrusion during submerged operation,
    wherein a powertrain is housed within the lower enclosure of the cart body.

2. A tactical transport cart configured to be manually navigable by a single human operator over both ground surfaces of topographic terrains and ater-covered surfaces of hydrographic terrains, the transport cart comprising:
    a frame having an open structure formed by a pair of laterally spaced-apart longitudinally-extending frame members, a triangular cart body centrally affixed and extending downwardly from the frame members defining a lower enclosure within the cart body, and a platform affixed to the frame at an upper side of the cart body defining a payload-supporting area on the frame,
    a pair of terrain-engaging transport propulsion members attached to the frame in laterally spaced relation for supporting the frame at an elevation above surrounding terrain,
    a handle structure attached to the frame and extending therefrom in orthogonal relation to the transport propulsion members,
    at least one motor connected in driving relation to the transport propulsion members,
    a battery for providing motive power to the motor,
    a control device operatively connected between the battery and the motor for controlling supply of motive power to the motor the control device including a switch device operable from the handle structure for selective actuation and deactuation of the motor,
    the handle structure being configured for manual grasping by a single human operator for steering movement of the frame over surrounding terrain while enabling simultaneous selective access to, and operation of the control device,
    the frame, transport propulsion members and handle structure being cooperatively dimensioned and configured for movement of the cart over ground surfaces of topographic terrains and for partially and fully submerged movement over water-covered surfaces of hydrographic terrains,
    the motor, the battery, the control device and connections therebetween being sealed against water intrusion during submerged operation,
    wherein the at least one motor is mounted within a lowermost region of the lower enclosure.

3. The tactical transport cart according to claim 2, wherein the terrain-engaging transport propulsion members comprise wheels rotatably attached to opposite sides of the frame.

4. The tactical transport cart according to claim 3, wherein the wheels comprise all-terrain tires.

5. The tactical transport cart according to claim 2, wherein the terrain-engaging transport propulsion members comprise track mechanisms attached to opposite sides of the frame.

6. The tactical transport cart according to claim 2, wherein the battery is contained within a sealed battery housing within the enclosure of the frame.

7. The tactical transport cart according to claim 2, wherein the motor is contained within a sealed motor housing within the enclosure of the frame with at least one drive shaft extending outwardly from the enclosure of the frame.

8. The tactical transport cart according to claim 2, wherein the frame includes a storage compartment within the enclosure.

9. The tactical transport cart according to claim 2, wherein the transport propulsion members are attached to a lower side of the cart body.

10. The tactical transport cart according to claim 9, wherein, the handle structure comprises a pair of laterally spaced-apart handles attached to rearward ends of the frame members.

11. The tactical transport cart according to claim 10, wherein the pair of laterally spaced-apart handles arc selectively mountable in multiple positions relative to the frame members.

12. The tactical transport cart according to claim 10, farther comprising a second pair of laterally spaced-apart handles attached to forward ends of the frame members for optional assisted navigation of the cart by a second human operator.

13. The tactical transport cart according to claim 2, further comprising a second handle structure attached to the frame for optional assisted navigation of the cart by a second human operator.

14. The tactical transport cart according to claim 2, wherein the switch device includes a throttle control on the handle structure for modulating operation of the motor.

15. A tactical transport cart configured to be navigable by a single human operator over both ground surfaces of topographic terrains and water-covered surfaces of hydrographic terrains, the transport cart comprising:
  a frame having an open structure formed by a pair of laterally spaced-apart longitudinally-extending frame members, a triangular cart body centrally affixed and extending, downwardly from the frame members defining a lower enclosure within the cart body, and a platform affixed to the frame at an upper side of the cart body defining a payload supporting area thereabove,
  a motor contained within the enclosure within a motor housing sealed against water intrusion and having at least one drive shaft with opposite shaft ends extending sealably outwardly through the motor housing and outwardly therefrom to opposite sides, of the frame at a lower side of the cart body,
  a pair of wheels affixed to the opposite ends of the at least one drive shaft in laterally spaced coaxial relation for supporting the frame substantially entirely above the axis of the wheels, the wheels including all-terrain high-flotation tires,
  a battery contained within the enclosure of the cart body within a battery housing sealed against water intrusion,
  a motor controller within the enclosure of the cart body in sealed operative connection, between the battery and the motor for controlling supply of motive power to the motor,
  a handle structure comprising a pair of laterally spaced-apart handles attached to rearward ends of the frame members in perpendicular relation to the axis of the wheels, and
  a switch device mounted on one of the handles and operatively con connected sealably to the motor controller for selective remote actuation of the motor, the switch device including a throttle control for modulating operation of the motor,
  the handle structure being configured for manual grasping of the handles by a single human operator for operation of the control device via the switch while simultaneously steering movement of the frame,
the frame, wheels and handle structure being cooperatively dimensioned and configured for rolling movement of the cart over ground surfaces of topographic terrains and for partially and fully submerged rolling movement over water-covered surfaces of hydrographic terrains,
  wherein a powertrain is housed within the lower, enclosure of the cart body.

16. A tactical transport cart configured to be manually navigable by a single human operator over both ground surfaces of topographic terrains and water-covered surfaces of hydrographic terrains, the transport call comprising:
  a frame having an open structure formed by a pair of laterally spaced-apart longitudinally-extending frame members, a triangular cart body centrally affixed and extending downwardly from the frame members defining a lower enclosure within the cart body, and a platform affixed to the frame at an upper side of the cart body defining a payload supporting area thereabove,
  a motor contained within the enclosure within a motor housing sealed against water intrusion and having at least one drive shaft with opposite shaft ends extending sealably outwardly through the motor housing and outwardly therefrom to opposite sides of the frame at a lower side of the cart body,
  a pair of wheels affixed to the opposite ends of the at least one drive shaft in laterally spaced coaxial relation for supporting the frame substantially entirely above the axis of the wheels, the wheels including all-terrain high-flotation tires,
  a battery contained within the enclosure of the cart body within a battery housing sealed against water intrusion,
  a motor controller within the enclosure of the cart body in sealed operative connection between the battery and the motor for controlling supply of motive power to the motor,
  a handle structure comprising a pair of laterally spaced-apart handles attached to rearward ends of the frame members in perpendicular relation to the axis of the wheels, and
  a switch device mounted on one of the handles and operatively connected sealably to the motor controller for selective remote actuation of the motor, the switch device including a throttle control for modulating operation of the motor,
  the handle structure being configured for manual grasping of the handles by a single human operator for operation of the control device via the switch while simultaneously steering movement of the frame,
the frame, wheels and handle structure being cooperatively dimensioned and configured for rolling movement of the cart over ground surfaces of topographic terrains and for partially and fully submerged rolling movement over water-covered surfaces of hydrographic terrains,
  wherein the at least one motor is mounted within a lowermost region of the lower enclosure.

17. The tactical transport cart according to claim 16, wherein the pair of laterally spaced-apart handles are selectively mountable in multiple positions relative to the frame members.

18. The tactical transport cart according to claim 16 further comprising a second pair of laterally spaced-apart handles attached to forward ends of the frame members for optional assisted navigation of the cart by a second human operator.

19. The tactical transport cart according to claim 16, wherein, the frame includes a storage compartment within the enclosure.

* * * * *